United States Patent
Wu

(10) Patent No.: US 10,733,468 B2
(45) Date of Patent: Aug. 4, 2020

(54) FINGER STABILITY DETECTING METHOD AND FINGERPRINT SENSING DEVICE

(71) Applicant: NOVATEK Microelectronics Corp., Hsin-Chu (TW)

(72) Inventor: Kuan-Lin Wu, Hsinchu (TW)

(73) Assignee: NOVATEK Microelectronics Corp., Hsin-Chu (TW)

(*) Notice: Subject to any disclaimer, the term of this patent is extended or adjusted under 35 U.S.C. 154(b) by 79 days.

(21) Appl. No.: 15/960,469

(22) Filed: Apr. 23, 2018

(65) Prior Publication Data

US 2019/0325242 A1  Oct. 24, 2019

(51) Int. Cl.
*G06K 9/03* (2006.01)
*G06K 9/00* (2006.01)
*G01L 1/20* (2006.01)

(52) U.S. Cl.
CPC .......... *G06K 9/03* (2013.01); *G06K 9/00013* (2013.01); *G01L 1/20* (2013.01)

(58) Field of Classification Search
CPC combination set(s) only.
See application file for complete search history.

(56) References Cited

U.S. PATENT DOCUMENTS

| | | | | |
|---|---|---|---|---|
| 2004/0258283 A1* | 12/2004 | Ikeda | ................ | G06K 9/00013 382/124 |
| 2006/0093192 A1* | 5/2006 | Bechtel | .............. | G06K 9/00013 382/126 |
| 2007/0076924 A1* | 4/2007 | Fujii | ................ | G06K 9/00013 382/124 |
| 2015/0135108 A1* | 5/2015 | Pope | .................... | A63F 13/537 715/767 |
| 2016/0188181 A1* | 6/2016 | Smith | .................... | G06F 3/045 715/765 |

* cited by examiner

*Primary Examiner* — Tsung Yin Tsai
(74) *Attorney, Agent, or Firm* — Winston Hsu

(57) ABSTRACT

A finger stability detecting method for a fingerprint sensing device includes triggering a pressure sensing function, receiving a pressure sensing value which is generated in response to triggering the pressure sensing function, and determining whether a finger touch is stable according to at least the pressure sensing value.

8 Claims, 4 Drawing Sheets

FINGER STABILITY DETECTING METHOD AND FINGERPRINT SENSING DEVICE

BACKGROUND OF THE INVENTION

1. Field of the Invention

The present invention relates to a finger stability detecting method and a fingerprint sensing device, and more particularly, to a finger stability detecting method and a fingerprint sensing device capable of obtaining accurate and full fingerprint images.

2. Description of the Prior Art

Fingerprint sensing technology is widely applied in a variety of portable electronic products such as a mobile phone, laptop, tablet, for realizing identity recognition. Fingerprint sensing allows a user to perform identity recognition conveniently. For example, the user only needs to put his/her finger on a fingerprint sensing device of the electronic device to login instead of entering long and tedious username and password.

The fingerprint sensing device captures a fingerprint image when a user's finger touches the fingerprint sensing device. However, an unstable finger touch may result in an incorrect fingerprint image. For example, when the fingerprint sensing device captures the fingerprint image before the user's finger properly touches, an incorrect fingerprint image may be generated. When the fingerprint sensing device captures the fingerprint image when the finger is leaving, an incorrect fingerprint image may also be generated. Thus, there is a need for improvement.

SUMMARY OF THE INVENTION

It is therefore an objective of the present invention to provide a finger stability detecting method and a fingerprint sensing device capable of obtaining accurate and full fingerprint images.

An embodiment of the present invention discloses a finger stability detecting method for a fingerprint sensing device, comprising triggering a pressure sensing function; receiving a pressure sensing value which is generated in response to triggering the pressure sensing function; and determining whether a finger touch is stable according to at least the pressure sensing value.

An embodiment of the present invention further discloses a fingerprint sensing device, comprising a triggering unit for triggering a pressure sensing function; a register unit for receiving a pressure sensing value which is generated in response to triggering the pressure sensing function; and a determining unit for determining whether a finger touch is stable according to at least the pressure sensing value.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
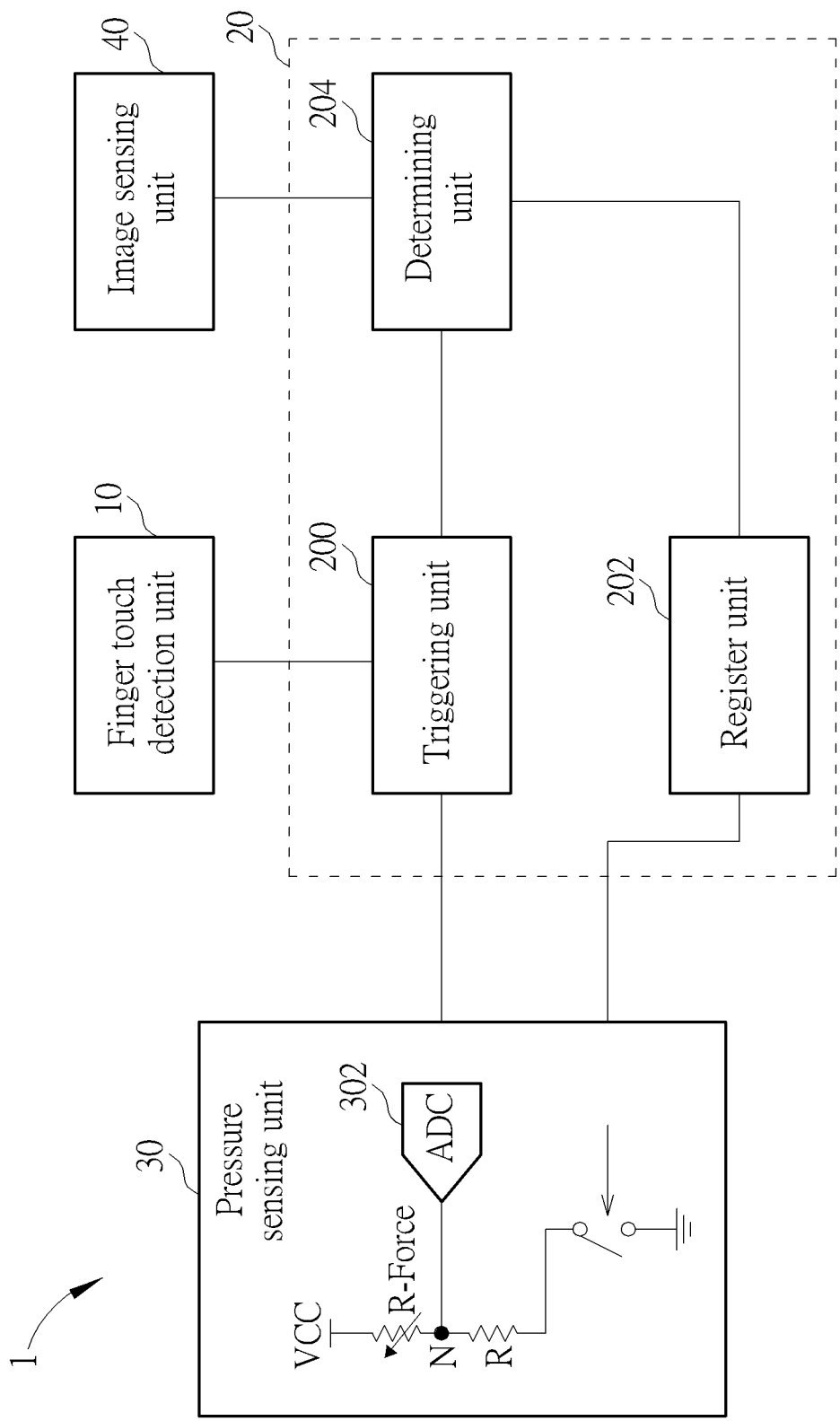
FIG. 1 is a schematic diagram of a fingerprint sensing device according to an embodiment of the present invention.

Please refer to FIG. 1, which is a schematic diagram of a fingerprint sensing device 1 according to an embodiment of the present invention. The fingerprint sensing device 1 includes a finger touch detection unit 10, a fingerprint stability detection unit 20, a pressure sensing unit 30 and an image sensing unit 40. The image sensing unit 40 includes a sensor array and a readout circuit. The finger touch detection unit 10 is utilized for detecting whether a finger touch occurs. In an example of the sensor array being a capacitive sensor array, a user's finger touch may alter the capacitance sensed by the sensor array. The finger touch detection unit 10 may determine whether a finger touch occurs according to a finger capacitance which may be measured by the image sensing unit 40.

The fingerprint stability detection unit 20 is utilized for determining whether a finger touch is stable according to at least a pressure sensing value sensed by the pressure sensing unit 30. As shown in FIG. 1, the fingerprint stability detection unit 20 includes a triggering unit 200, a register unit 202 and a determining unit 204. The triggering unit 200 is configured to trigger a pressure sensing function performed by the pressure sensing unit 30. In response to triggering the pressure sensing function, the pressure sensing unit 30 generates a pressure sensing value associated with the finger touch. The register unit 202 is configured to receive and store the pressure sensing value which is generated in response to triggering the pressure sensing function. The register unit 202 may include one or more registers for storing one or more pressure sensing values. The determining unit 204 is configured to determine whether the finger touch is stable according to at least the pressure sensing value.

In the embodiment shown in FIG. 1, the pressure sensing unit 30 can be installed in the fingerprint sensing device 1 for obtaining the pressure sensing value. In another embodiment, the pressure sensing unit 30 may be replaced with a pressure sensing unit installed outside the fingerprint sensing device 1 for obtaining the pressure sensing value associated with the finger touch. The pressure sensing unit 30 can be realized by any detection circuit which can detect a pressure value of the finger touch. For example, as shown in FIG. 1, the pressure sensing unit 30 includes, but is not limited to, a force sensitive resistor R_Force, a resistor R and an analog-to-digital converter 302. When a pressure is applied to the fingerprint sensing device 1 or to the pressure sensing unit 30, the resistance of the force sensitive resistor R_Force may vary depending on the applied pressure. The force sensitive resistor R_Force and the resistor R form a voltage divider, and thus the voltage level of an output node N of the voltage divider varies with the pressure applied to the fingerprint sensing device 1 or to the pressure sensing unit 30. The analog-to-digital converter 302 receives a voltage of the output node N of the voltage divider and generates the pressure sensing value associated with the finger touch according to the voltage of the output node N.

In response to that the finger touch is determined as stable by the determining unit 204, the image sensing unit 40 performs a fingerprint image sensing process to obtain a fingerprint image. The sensor array of the image sensing unit 40 may include a plurality of sensing units. Each sensing unit may include a sensing electrode and a charge amplifier coupled to the sensing electrode. The charge amplifier converts the charge carried by the sensing electrode to a sensing signal output to the readout circuit. The readout circuit samples and converts the received sensing signals respectively corresponding to the sensing units to digital values. The image sensing unit 40 further includes a data processing unit configured to process the digital values from the readout circuit to generate a fingerprint image.

In a brief, by the fingerprint stability detection unit 20, the fingerprint sensing device 1 may prevent from generating an incorrect fingerprint image while the finger does not fully touch or the finger is leaving from the fingerprint sensing device and may generate an accurate fingerprint image after the finger touch is determined as stable.

Figure 2:
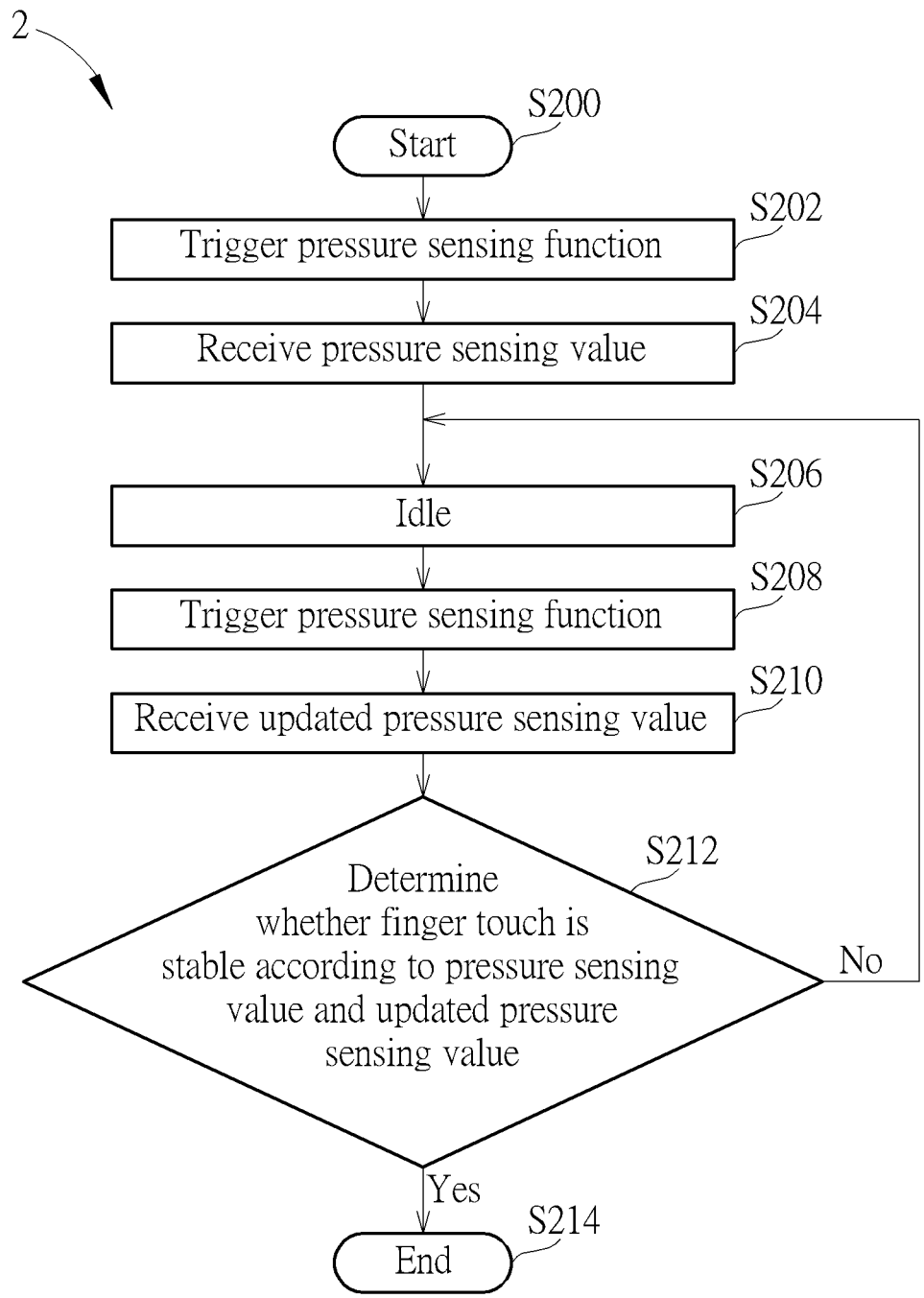
FIG. 2 is a flow diagram of a procedure according to an embodiment of the present invention.

FIG. 2 is a flow diagram of a procedure 2 according to an embodiment of the present invention. The procedure 2 can be applied to the fingerprint stability detection unit 20 of the fingerprint sensing device 1 shown in FIG. 1. The procedure 2 includes the following steps:

Step S200: Start.
Step S202: Trigger a pressure sensing function.
Step S204: Receive pressure sensing value.
Step S206: Idle.
Step S208: Trigger the pressure sensing function.
Step S210: Receive an updated pressure sensing value.
Step S212: Determine whether a finger touch is stable according to the pressure sensing value and the updated pressure sensing value; if yes, go to Step S214; if no, go to Step S206.
Step S214: End.

When the finger touch detection unit 10 detects there is a finger touch occurring on the fingerprint sensing device 1, the fingerprint stability detection unit 20 may perform the procedure 2 in response. According to the procedure 2, in Step S202, the triggering unit 200 triggers a pressure sensing function, which is performed by the pressure sensing unit 30. In response to the triggering of the triggering unit 200, the pressure sensing unit 30 performs the pressure sensing function to obtain a pressure sensing value associated with the finger touch and transmits the pressure sensing value to the register unit 202. From the above, the first time triggering the pressure sensing function is performed by the triggering unit 200 in response to that the finger touch is detected.

In Step S204, the register unit 202 receives the pressure sensing value from the pressure sensing unit 30. The register unit 202 stores the pressure sensing value.

In Step S206, the fingerprint stability detection unit 20 waits (standbys) for a predetermined idle period. The predetermined idle period is configured to prevent the fingerprint stability detection unit 20 from receiving a pressure sensing value with respect to an unstable finger touch too soon. After the predetermined idle period, in Step S208, the triggering unit 200 triggers the pressure sensing function again. In response to the triggering of the triggering unit 200, the pressure sensing unit 30 performs the pressure sensing function to obtain another pressure sensing value associated with the finger touch, which is taken as an updated pressure sensing value. The pressure sensing unit 30 transmits the updated pressure sensing value to the fingerprint stability detection unit 20.

In Step S210, the register unit 202 receives and stores the updated pressure sensing value from the pressure sensing unit 30. From the above, the register unit 202 stores two pressure sensing values, wherein one pressure sensing value is generated in response to the previous triggering (e.g., the i-th time triggering the pressure sensing function) and the other pressure sensing value is generated in response to the current triggering (e.g., the (i+1)-th time of triggering the pressure sensing function). As such, the updated pressure sensing value generated by the pressure sensing unit 30 in Step S208 is the latest pressure sensing value.

In Step S212, the determining unit 204 obtains the pressure sensing value and the updated pressure sensing value from the register unit 202, and determines whether the finger touch is stable according to the pressure sensing value and the updated pressure sensing value.

In a detailed example, the determining unit 204 can determine whether the finger touch is stable by comparing a threshold and a difference value generated based on the pressure sensing value and the updated pressure sensing value. The difference value may be calculated by subtracting the pressure sensing value from the updated pressure sensing value. Alternatively, the pressure sensing value and the updated pressure sensing value may be applied with different weightings. The difference value may be calculated by subtracting the pressure sensing value with a first weighting from the updated pressure sensing value with a second weighting.

When the difference value is greater than or equal to the threshold, the determining unit 204 determines that the finger touch is unstable. When the determining unit 204 determines that the finger touch is unstable, the fingerprint stability detection unit 20 performs Steps S206, S208, S210 and S212 again. The fingerprint stability detection unit 20 may repeatedly perform the steps S206 to S212 until the finger touch is determined as stable. In addition, before performing Step S206 again, the pressure sensing value stored in the register unit 202 may be replaced with the updated pressure sensing value stored in the register unit 202.

On the other side, when the difference value is smaller than the threshold, the determining unit 204 determines that the finger touch is stable. In response to that the finger touch is determined as stable, the image sensing unit 40 performs fingerprint image sensing to obtain a fingerprint image.

Figure 3:
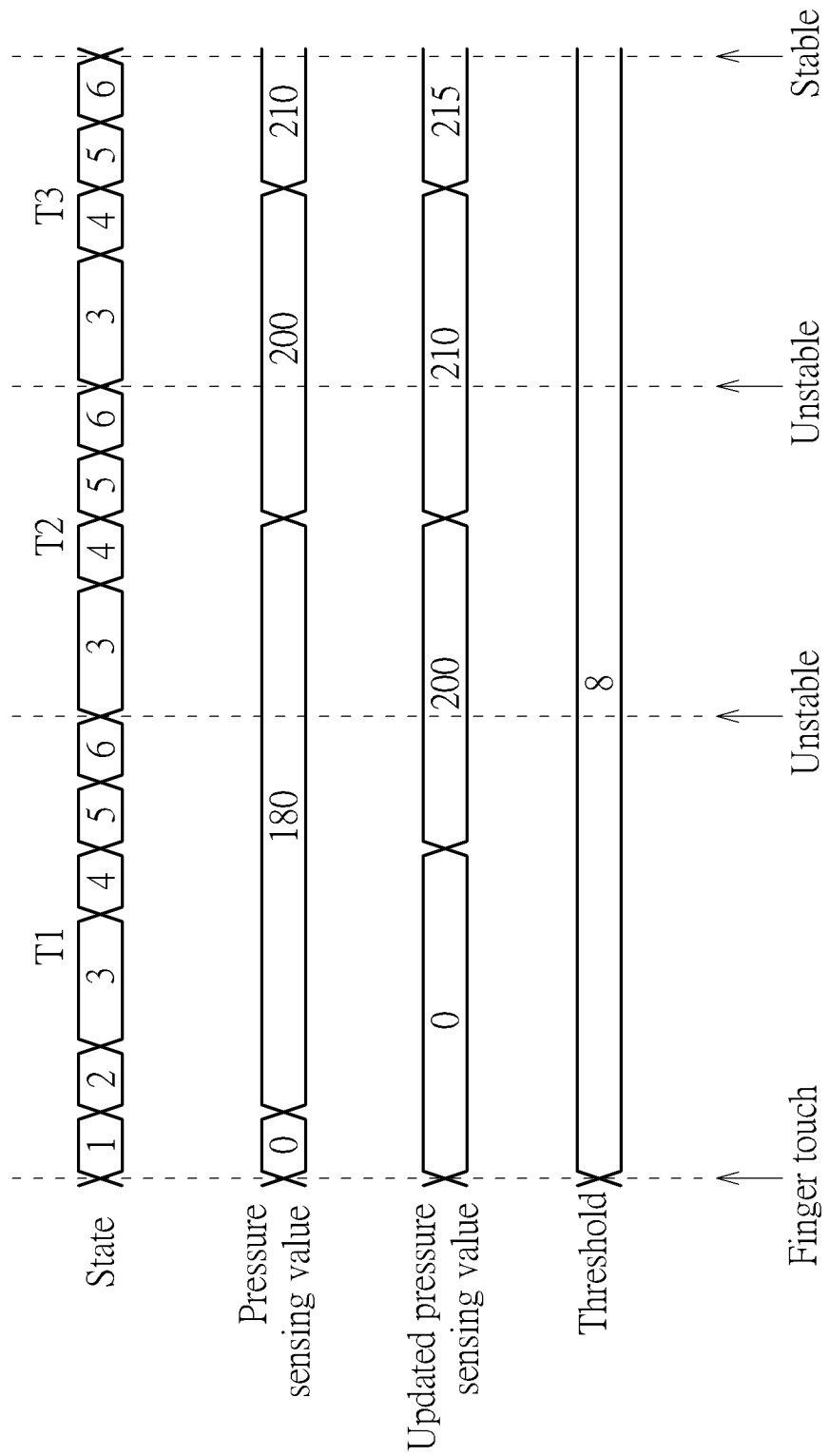
FIG. 3 is a data timing diagram of the pressure sensing value and the updated pressure sensing value according to an embodiment of the present invention.

Please refer to FIG. 3, which is a data timing diagram of the pressure sensing value and the updated pressure sensing value according to an embodiment of the present invention. The pressure sensing value and the updated pressure sensing value are assumed to be zero as an initial value and a threshold is assumed to be eight. State 1 to state 6 represents different states that the fingerprint sensing device 1 is in. In response to a finger touch detected by the finger touch detection unit 10, the fingerprint sensing device 1 starts state 1. In state 1 duration of a period T1, the triggering unit 200 triggers (as step S202) the pressure sensing unit 30 to perform a pressure sensing function, and the pressure sensing unit 30 obtains a first pressure sensing value, 180. In state 2 duration of the period T1, the register unit 202 receives (as step S204) the first pressure sensing value (180) and stores the first pressure sensing value (180). The initial pressure sensing value (0) is replaced with the first pressure sensing value (180). In state 3 duration of the period T1, the fingerprint stability detection unit 20 waits for a predetermined idle period (as step S206).

In state 4 duration of the period T1, the triggering unit 200 triggers (as step S208) the pressure sensing unit 30 to perform the pressure sensing function again to obtain a second pressure sensing value, 200. In state 5 duration of the period T1, the register unit 202 receives (as step S210) the second pressure sensing value (200) and stores the second pressure sensing value (200). The initial updated pressure sensing value (0) is replaced with the second pressure sensing value (200). In such a situation, the pressure sensing value stored in the register unit 202 is 180, and the updated pressure sensing value stored in the register unit 202 is 200. In state 6 duration of the period T1, the determining unit 204 determines (as step S212) whether the finger touch is stable according to the pressure sensing value (180) and the updated pressure sensing value (200). The determining unit 204 calculates a difference value between the updated pressure sensing value (200) and the pressure sensing value (180) and compares the calculated difference value (200−180=20) with the threshold (8). The comparison result indicates that the difference value is greater than the threshold (i.e., 20>8). Accordingly, the determining unit 204 determines that the finger touch is unstable. In response to that the finger touch is determined as unstable, a next period T2 including state 3 to state 6 which are associated with steps S206 to S212 starts.

In state 3 duration of the period T2, the fingerprint stability detection unit 20 waits for the predetermined idle period. In state 4 duration of the period T2, the triggering unit 200 triggers the pressure sensing unit 30 to perform the pressure sensing function again to obtain a third pressure sensing value, 210. In state 5 duration of the period T2, the pressure sensing value which is the first pressure sensing value (180) is replaced with the updated pressure sensing value which is the second pressure sensing value (200), and the register unit 202 receives and stores the third pressure sensing value (210) as the updated pressure sensing value. It is noted that to replace the pressure sensing value with the updated pressure sensing value in state 5 of the period T2 is an example. In another example, the pressure sensing value may be replaced with the updated pressure sensing value in state 3 or state 4 of the period T2, as long as the determining unit 204 has determined that the finger touch is unstable.

Further, in state 6 duration of the period T2, the determining unit 204 determines whether the finger touch is stable according to the pressure sensing value (200) and the updated pressure sensing value (210). The determining unit 204 calculates a difference value between the updated pressure sensing value (210) and the pressure sensing value (200) and compares the calculated difference value (210−200=10) with the threshold (8). The comparison result indicates that the difference value is greater than the threshold (i.e., 10>8). Accordingly, the determining unit 204 determines that the finger touch is still unstable. Therefore, in response to that the finger touch is determined as not stable, a next period T3 including state 3 to state 6 which are associated with steps S206 to S212 starts.

In state 3 duration of the period T3, the fingerprint stability detection unit 20 waits for the predetermined idle period. In state 4 duration of the period T3, the triggering unit 200 triggers the pressure sensing unit 30 to perform the pressure sensing function again to obtain a fourth pressure sensing value, 215. In state 5 duration of the period T3, the pressure sensing value which is the second pressure sensing value (200) is replaced with the updated pressure sensing value which is the third pressure sensing value (210), and the register unit 202 receives and stores the fourth pressure sensing value (215) as the updated pressure sensing value. In state 6 duration of the period T3, the determining unit 204 determines whether the finger touch is stable according to the pressure sensing value (210) and the updated pressure sensing value (215). The determining unit 204 calculates a difference value between the updated pressure sensing value (215) and the pressure sensing value (210) and compares the calculated difference value (215−210=5) with the threshold (8). The comparison result indicates that the difference value is smaller than the threshold (i.e., 5<8). Accordingly, the determining unit 204 determines that the finger touch is stable. In other words, the fingerprint stability detection unit 20 can determine whether the finger touch is stable according to the pressure sensing value generated by the pressure sensing unit 30 in response to the previous triggering (e.g., the i-th time triggering the pressure sensing function) and the updated pressure sensing value generated by the pressure sensing unit 30 in response to the current triggering (e.g., the (i+1)-th time triggering the pressure sensing function).

Figure 4:
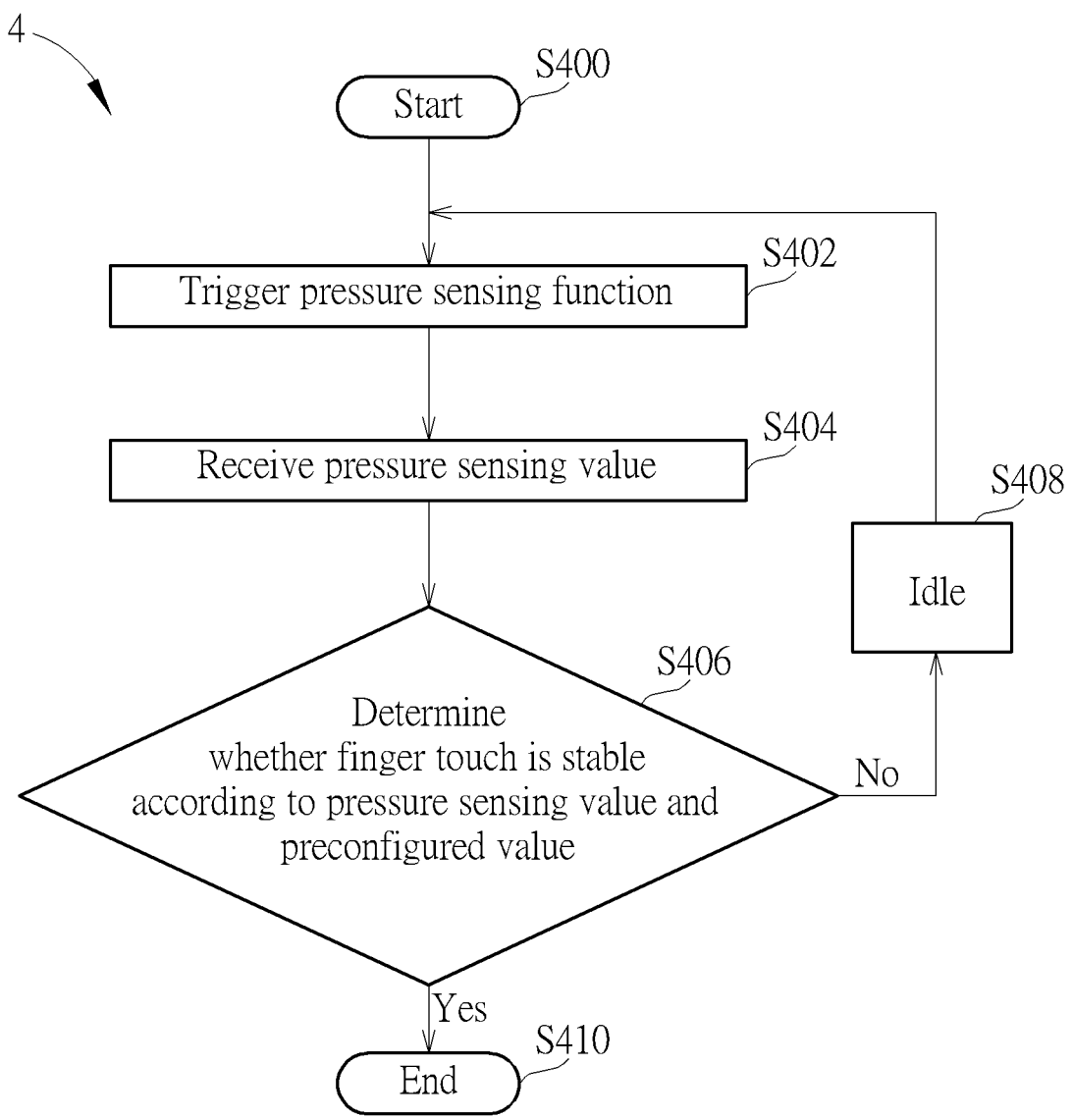
FIG. 4 is a flow diagram of a procedure according to an embodiment of the present invention.

FIG. 4 is a flow diagram of a procedure 4 according to an embodiment of the present invention. The procedure 4 can be applied to the finger stability detection unit 20 shown in FIG. 1. As shown in FIG. 4, the procedure 4 includes the following steps:

Step S400: Start.
Step S402: Trigger a pressure sensing function.
Step S404: Receive a pressure sensing value.
Step S406: Determine whether a finger touch is stable according to the pressure sensing value and a preconfigured value; if yes, go to Step S410; if no, go to Step S408.
Step S408: Idle.
Step S410: End.

When the finger touch detection unit 10 detects there is a finger touch occurring on the fingerprint sensing device 1, the fingerprint stability detection unit 20 may perform the procedure 4 in response. According to the procedure 4, in Step S402, the triggering unit 200 triggers a pressure sensing function performed by the pressure sensing unit 30. In response to the triggering of the triggering unit 200, the pressure sensing unit 30 performs the pressure sensing function to obtain a pressure sensing value associated with the finger touch and transmits the pressure sensing value to the register unit 202 of the fingerprint stability detection unit 20. According to the procedure 4, the first time triggering the pressure sensing function is performed by the triggering unit 200 in response to that the finger touch is detected.

In Step S404, the register unit 202 receives the pressure sensing value from the pressure sensing unit 30. The register unit 202 stores the pressure sensing value.

In Step S406, the determining unit 204 determines whether the finger touch is stable according to the pressure sensing value and a preconfigured value. The preconfigured value can be preset with respect to the user of the fingerprint sensing device 1. In a detailed example, the determining unit 204 determines whether the finger touch is stable by comparing a threshold and a difference value generated based on the pressure sensing value and the preconfigured value. The difference value may be calculated by subtracting the preconfigured value from the pressure sensing value. In another embodiment, the pressure sensing value and the preconfigured value may be applied with different weightings. The difference value may be calculated by subtracting the preconfigured value with a first weighting from the pressure sensing value with a second weighting.

When the difference value generated is greater than or equal to the threshold, the determining unit 204 determines that the finger touch is unstable. When the determining unit 204 determines that the finger touch is unstable, the procedure 4 performs Step S408. In Step S408, the fingerprint stability detection unit 20 waits for a predetermined idle period. After the predetermined idle period, the fingerprint stability detection unit 20 performs Steps S402 to S406 again. The fingerprint stability detection unit 20 may repeatedly perform the steps S402 to S406 until the finger touch is determined as stable.

On the other side, when the difference value is smaller than the threshold, the determining unit 204 determines that the finger touch is stable. In response to that the finger touch is determined as stable, the image sensing unit 40 performs fingerprint image sensing to obtain a fingerprint image.

Note that, those skilled in the art should readily make combinations, modifications and/or alterations on the abovementioned description and examples. The abovementioned steps of the procedures including suggested steps can be realized by means that could be hardware, firmware, or computer instructions or programs stored in a non-transitory computer readable medium. Examples of hardware can include analog circuits, digital circuits and mixed circuits.

In summary, the embodiments of the present invention can determine whether a finger touch is stable according to pressure sensing values and such that the fingerprint sensing device performs a fingerprint image sensing process under the situation that the finger touch is determined as stable. Accordingly, the fingerprint sensing device is able to acquire an accurate and full fingerprint image.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A finger stability detecting method for a fingerprint sensing device, comprising:
    (a) triggering a pressure sensing function;
    (b) receiving a pressure sensing value which is generated in response to triggering the pressure sensing function;
    (c) determining whether a finger touch is stable according to at least the pressure sensing value, wherein the step (c) comprises determining whether the finger touch is stable by comparing a threshold and a difference value generated based on the pressure sensing value and a updated pressure sensing value or a preconfigured value, wherein the pressure sensing value is generated in response to the i-th time triggering the pressure sensing function and the updated pressure sensing value is generated in response to the (i+1)-th time triggering the pressure sensing function, wherein i is a positive integer; and
    (d) in response to that the finger touch is determined as stable based on that the difference value is smaller than the threshold, performing fingerprint image sensing to obtain a fingerprint image.

2. The finger stability detecting method of claim 1, further comprising:
    in response to that the finger touch is determined not stable, repeatedly performing the steps (a) to (c) until the finger touch is determined as stable.

3. The finger stability detecting method of claim 2, wherein there is an idle period before the (i+1)-th time triggering the pressure sensing function from that the finger touch is determined not stable according to the pressure sensing value received in response to the i-th time triggering the pressure sensing function, wherein i is a positive integer.

4. The finger stability detecting method of claim 1, wherein the first time triggering the pressure sensing function is performed in response to that the finger touch is detected.

5. A fingerprint sensing device, comprising:
    a triggering unit for triggering a pressure sensing function;
    a register unit for receiving a pressure sensing value which is generated in response to triggering the pressure sensing function;
    a determining unit for determining whether a finger touch is stable according to at least the pressure sensing value, wherein the determining unit is configured to compare a threshold with a difference value generated based on the pressure sensing value and a updated pressure sensing value or a preconfigured value, and wherein the pressure sensing value is generated in response to the i-th time triggering the pressure sensing function and is received by the register unit, and the updated pressure sensing value is generated in response to the (i+1)-th time triggering the pressure sensing function and is received by the register unit, wherein i is a positive integer; and
    an image sensing unit for performing fingerprint image sensing to obtain a fingerprint image in response to that the finger touch is determined as stable based on that the difference value is smaller than the threshold.

6. The fingerprint sensing device of claim 5, wherein the triggering unit is configured to trigger the pressure sensing function for the first time in response to that the finger touch is detected.

7. The fingerprint sensing device of claim 5, wherein the pressure sensing function is implemented in a pressure sensing unit installed in the fingerprint sensing device.

8. The fingerprint sensing device of claim 5, wherein the pressure sensing function is implemented in a pressure sensing unit installed outside the fingerprint sensing device.

\* \* \* \* \*